United States Patent [19]
Stone

[11] 3,974,982
[45] Aug. 17, 1976

[54] TAPE TRANSPORT
[75] Inventor: Robert L. Stone, Portland, Conn.
[73] Assignee: Raymond Engineering Inc., Middletown, Conn.
[22] Filed: Feb. 24, 1975
[21] Appl. No.: 552,303

[52] U.S. Cl. ............................... 242/192; 242/198
[51] Int. Cl.² ..................... G03B 1/04; G11B 15/32
[58] Field of Search ............ 242/192, 76, 197, 199; 226/108, 111, 188, 190–195

[56] References Cited
UNITED STATES PATENTS

| | | | |
|---|---|---|---|
| 3,305,186 | 2/1967 | Burdorf et al. | 242/192 |
| 3,625,456 | 12/1971 | Hankins | 242/192 |
| 3,829,040 | 8/1974 | Nelson | 242/199 |

*Primary Examiner*—Leonard D. Christian

[57] ABSTRACT

A peripheral belt tape transport for driving flangeless hubs is presented. The hub shafts and idlers for the tape drive are convex.

6 Claims, 3 Drawing Figures

TAPE TRANSPORT

BACKGROUND OF THE INVENTION

This invention relates to the field of tape transports for magnetic tape recorders. More particularly, this invention relates to tape transports having flangeless tape reel hubs and a peripheral tape drive.

Peripheral tape drives are well known in the art. Reference is hereby made to my prior U.S. Pat. No. 3,620,473, assigned to the assignee hereof, for a disclosure and discussion of peripheral drive tape transports. As pointed out in my said U.S. Pat. No. 3,620,473, peripheral tape drive systems having flangeless hubs, although known in the art, are often plagued with the serious problem of tape spills. Because of the problem of tape spills, flanged hubs have been employed. While flanged hubs are certainly satisfactory to solve the problem of tape spills, they do involve a size or space disadvantage. That is, the hub shafts or spindles must be spaced apart a sufficient distance to avoid interference between the hub flanges, and thus the minimum distance between hub centers is determined by the diameters of the hub flanges. By way of contrast a flangeless configuration permits the hub shafts to be moved closer together, the minimum separation distance being just slightly greater than the radius of one of the tape packs when fully wound on one of the hubs plus the radius of an empty hub. Thus, flangeless configurations are important where space requirements are critical. A significant cost advantage can also be realized by eliminating the flanges.

Also in belt drive systems such as my prior U.S. Pat. No. 3,620,473, flangeless tape hubs may develop a problem in the drive belt gradually drifting and disengaging from the tape.

Still another aspect of the prior art is that high precision (and thus costly) preloaded ball bearings are required for the hub shafts to prevent wobbling of the hubs which would result in both tape and belt spills.

SUMMARY OF THE INVENTION

In the present invention a flangeless configuration is achieved while eliminating or minimizing the problem of tape spills and disengagement of the drive belt from the tape pack. The flangeless configuration of the present invention is realized by the use of convex contact surfaces on the idler rollers and tape hubs of the tape transport. The drive belt rides on the convex curved idler surfaces, and the tape is wound on the convex curved hub surfaces. While my prior U.S. Pat. No. 3,620,473 discloses the concept of slight convex curvature of the idlers or belt guides which will provide a self-centering characteristic for the belt guide when used with flanged hubs, the present invention involves a coordinated arrangement wherein both the tape hubs and the idlers are convexly curved. Furthermore, in accordance with the present invention the radius of curvature on the tape hubs is preferably greater than the radius of curvature on the idlers to prevent excess cupping of the tape, the radius of curvature on each of the tape hubs being preferably, but not necessarily, at least twice the radius of curvature on any of the idlers.

BRIEF DESCRIPTION OF THE DRAWINGS

Referring now to the drawings, wherein like elements are numbered alike in the several figures.

DESCRIPTION OF THE PREFERRED EMBODIMENT

Figure 1:
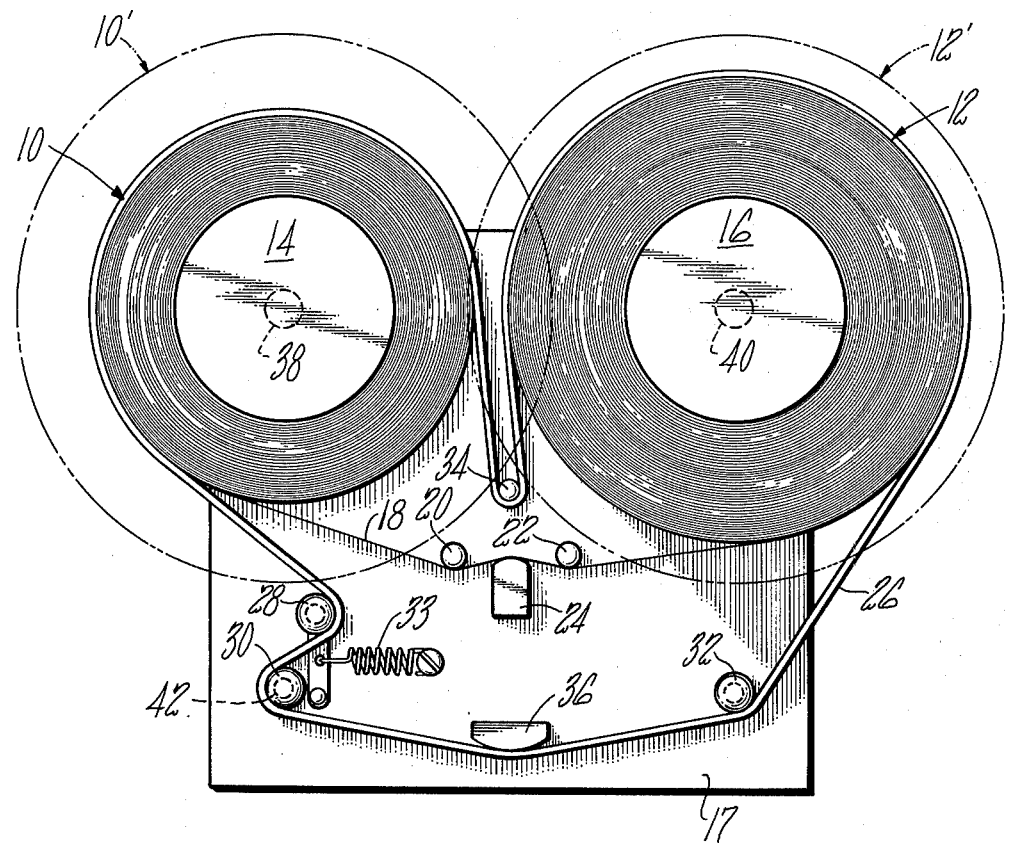
FIG. 1 is a schematic plan view of a tape transport in accordance with the present invention.

Only a schematic representation of a tape transport is shown in FIG. 1, that schematic showing being sufficient for purposes of fully disclosing and describing the present invention. Reference is hereby made to my prior U.S. Pat. No. 3,620,473, which patent is incorporated herein by reference, for other details of the tape transport.

Referring to FIG. 1, a pair of tape packs 10 and 12 are mounted on tape hubs 14 and 16, respectively. The tape 18 passes from one tape pack to the other around a pair of fixed guides 20 and 22, and the tape is maintained in contact with a magnetic head 24 by tension in the tape. It will, of course, be understood that the tape is transferred between tape packs 10 and 12 depending upon the direction in which the hubs are rotating, the tape being a single continuous length of tape. The circles 10' and 12' shown in phantom around each tape pack represent the maximum diameter of each tape pack when all of the tape is fully wound on one pack or the other. The tape is driven by a peripheral belt 26 which passes around both tape packs 10 and 12 and around three freely rotatable belt guides or idlers 28, 30 and 32. Idler 28 is biased by a spring 33 which will provide tension in belt 26. Belt 26 is driven by a capstan 34, and belt 26 passes over a chute 36 which acts as a brake in the system. Each of the hubs 14 and 16 is rotatably supported on frame 17 by shafts 38 and 40, respectively, and each idler is also mounted on frame 17 by shafts 42.

Capstan 34 is powered by an appropriate motor to drive peripheral belt 26 whereby the tape packs are driven in the manner set forth in U.S. Pat. No. 3,620,473. It will, however, be noted that the spacing between the centers of hubs 14 and 16 is such that there may even be an overlap between the phantom circles 10' and 12'. That is, the distance between the centers of shafts 38 and 40 can be less than twice the radius of a fully loaded tape pack since the tape packs are flangeless, and thus there are no flanges to interfere.

Figure 3:
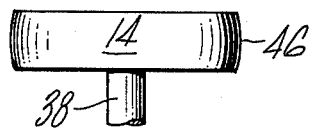
FIG. 3 is an elevation view of one of the tape hubs of FIG. 1.
Figure 2:
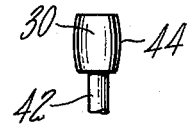
FIG. 2 is an elevation view of one of the idlers of FIG. 1.

Referring now to FIGS. 2 and 3, elevation views of an idler and a tape hub, respectively, are shown. All the idlers and both the tape hubs have the configuration shown in FIGS. 2 and 3, respectively. The exterior surface 44 of the idler which is engaged by belt 26 is formed in a convex curve. Also, the exterior surface 46 of the tape hub around which the tape is wound is formed with a convex surface. With respect to both the hubs and the idler, the term "convex" is used to mean that the center portion projects outwardly more than the side portions, with curved shapes being preferable. The convexity of the idlers keeps the drive belt centered so that the belt does not move up and down with respect to the tape. The convex surface on the tape hubs is projected through all layers of the tape, whereby each layer of the tape sees a convex surface as it wraps around preceding layers of the tape on a hub. The convexity of the hub, and the projected convex surface which each successive layer of tape sees as it is wound, achieves and retains a smooth windup and unwind of the tape and a smooth upper and lower surface on each tape pack as it winds and unwinds.

In order to provide compatibility between the tape and the hubs and between the outer surface of each tape pack and the drive belt with which such outer surface is in contact, a differential radius may be established between the convex surfaces on the idlers and the hubs to prevent excess cupping of the tape. In accordance with this differential arrangement, the radius of the convex surface 46 would be larger than the radius of the convex surface 44, the ratio between the radii of surfaces 46 and 44 being preferably at least two to one and ranging from about 1.25:1 to 3:1. Thus, the curvature of the hub surfaces 46 is less than, i.e. flatter than, the idler surfaces 44.

Exposure of the tape packs to temperature differentials, such as may occur in air-freight shipment, can cause voids to develop in the tape pack thus resulting in tape spills and destroyed tape. To overcome this problem, another feature of the present invention is that the coefficient of expansion of the material of tape 18 is matched as closely as possible to the coefficient of expansion of the material of hubs 38 and 40. This matching of the coefficients of expansion of the tape hub materials further contributes to avoidance of tape spills. One example of matched materials would be carbon hubs and 3M tape 156 (Minnesota Mining & Manufacturing Company), the tape being a mylar substrate coated with an oxide binder system.

In addition to the advantages discussed above, the present invention eliminates the need for high precision ball bearings, and sleeve bearings are used for the hub shafts 38 since wobble of the tape hubs can now be tolerated without causing tape or belt spills.

From the foregoing it can be seen that a particularly effective and useful tape transport is produced having flangeless hubs wherein tape spills are totally or substantially eliminated.

While a preferred embodiment has been shown and described, it will be understood that various modifications and substitutions may be made thereto without departing from the spirit and scope of the invention.

Accordingly, the present invention has been described by way of illustration and not limitation.

What is claimed is:

1. A tape transport for minimizing spillage of the tape from the hubs and disengagement of the drive belt from the tape on the hubs, the tape transport including:
   a base for mounting tape transport elements;
   a pair of hubs rotatably mounted on said base for transferring tape therebetween, each of said hubs having an outer convex annular surface for receiving tape whereby tape on said hubs assumes a convex curved surface;
   drive belt means for driving said hubs to transfer tape between said hubs; and
   a plurality of idler means rotatably mounted on said base, each of said idler means having an outer convex surface;
   said drive belt means being in contact with said convex surfaces of said idler means and with the convex curved surface of tape on said hubs.

2. A tape transport as in claim 1 wherein:
   the convex curvature of said outer surface of said hubs is less than the curvature of said outer convex surfaces of said idler means.

3. A tape transport as in claim 1 wherein:
   the curvature of said annular surfaces of said hubs is a circular arc and the curvature of said outer surfaces of said idler means is also a circular arc.

4. A tape transport as in claim 3 wherein:
   the radius of curvature of said convex annular surfaces of said hubs is greater than the radius of curvature of said convex outer surfaces of said idler means.

5. A tape transport as in claim 4 wherein:
   said radius of curvature of said annular surfaces of said hubs is at least two times the radius of curvature of said outer surfaces of said idler means.

6. A tape transport as in claim 1 wherein:
   the temperature coefficient of expansion of said hubs is approximately equal to the temperature coefficient of expansion of the tape.

* * * * *